(12) United States Patent
Mori

(10) Patent No.: US 8,310,017 B2
(45) Date of Patent: Nov. 13, 2012

(54) PRESSURE SENSOR AND METHOD OF MANUFACTURING THE SAME

(75) Inventor: Seiji Mori, Yokohama (JP)

(73) Assignee: Marusan Name Co., Ltd., Yokohama-Shi (JP)

( * ) Notice: Subject to any disclaimer, the term of this patent is extended or adjusted under 35 U.S.C. 154(b) by 338 days.

(21) Appl. No.: 12/805,612

(22) Filed: Aug. 10, 2010

(65) Prior Publication Data

US 2011/0084346 A1    Apr. 14, 2011

(30) Foreign Application Priority Data

Oct. 13, 2009 (JP) .................................. 2009-235909

(51) Int. Cl.
*H01L 29/84* (2006.01)

(52) U.S. Cl. . 257/415; 257/417; 257/419; 257/E29.324; 438/50

(58) Field of Classification Search .................. 257/415, 257/E29.324, E21.001, 417, 418, 419; 438/50
See application file for complete search history.

(56) References Cited

U.S. PATENT DOCUMENTS

| 7,367,234 B2 * | 5/2008 | Watanabe | 73/718 |
| 2009/0179523 A1 * | 7/2009 | Wang et al. | 310/338 |

FOREIGN PATENT DOCUMENTS

JP        2001-332406 A    11/2001

* cited by examiner

*Primary Examiner* — Thinh T Nguyen
(74) *Attorney, Agent, or Firm* — Manabu Kanesaka (57) ABSTRACT

The present invention provides a pressure sensor and a method of manufacturing the same, which can change resistance to load smoothly in a relatively small load range and detect the pressure to the extent of relatively large load range. An uneven layer 6 is formed of a resin containing non-conductive particles 6a and having insulation properties, on a surface of the second substrate 3, and a resistor layer 7 containing at least carbon powder and having a certain film thickness is formed on a surface of the uneven layer 6. A sum of a film thickness of the uneven layer 6 between the non-conductive particles 6a and a film thickness of the resistor layer 7 is smaller than a particle diameter of non-conductive particles 6a included in the uneven layer, and at least a resistor layer 7 is formed on the non-conductive particles 6a and between the non-conductive particles 6a.

7 Claims, 6 Drawing Sheets

Prior Art

FIG. 7

Prior Art

FIG. 8

Prior Art

PRESSURE SENSOR AND METHOD OF MANUFACTURING THE SAME

BACKGROUND OF THE INVENTION

1. Field of the Invention

The present invention relates to a pressure sensor which detects a change in load based on a change in resistance and a method of manufacturing the same.

2. Description of the Related Art

Figure 6:
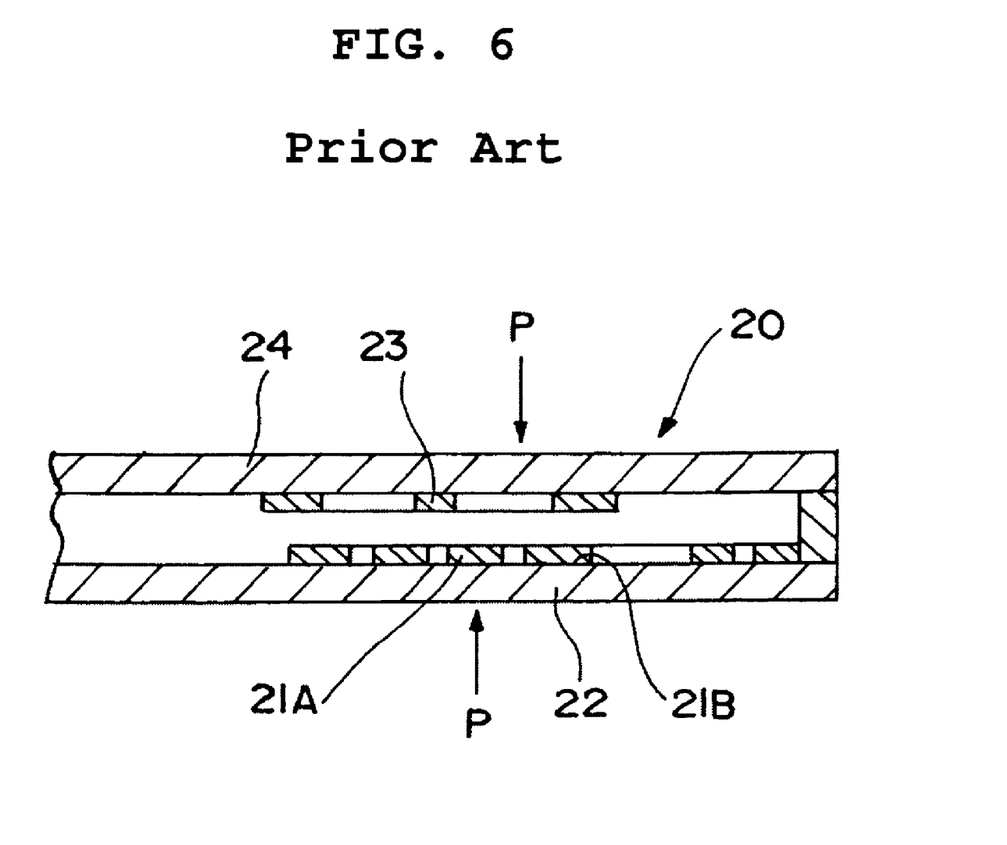
FIG. 6 is a sectional view of a conventional pressure sensor.
Figure 7:
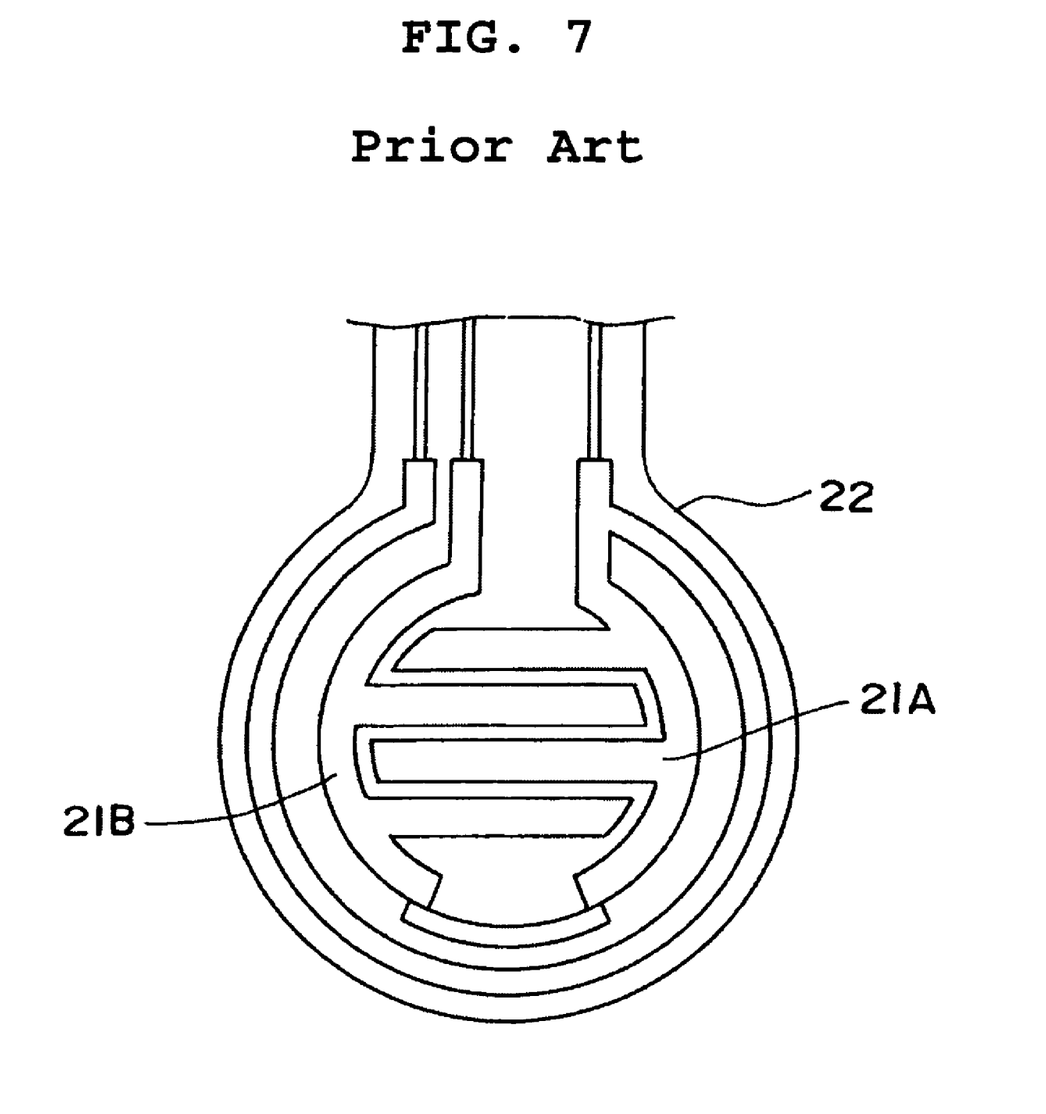
FIG. 7 is a plan view showing electrode layers of the conventional pressure sensor.
Figure 8:
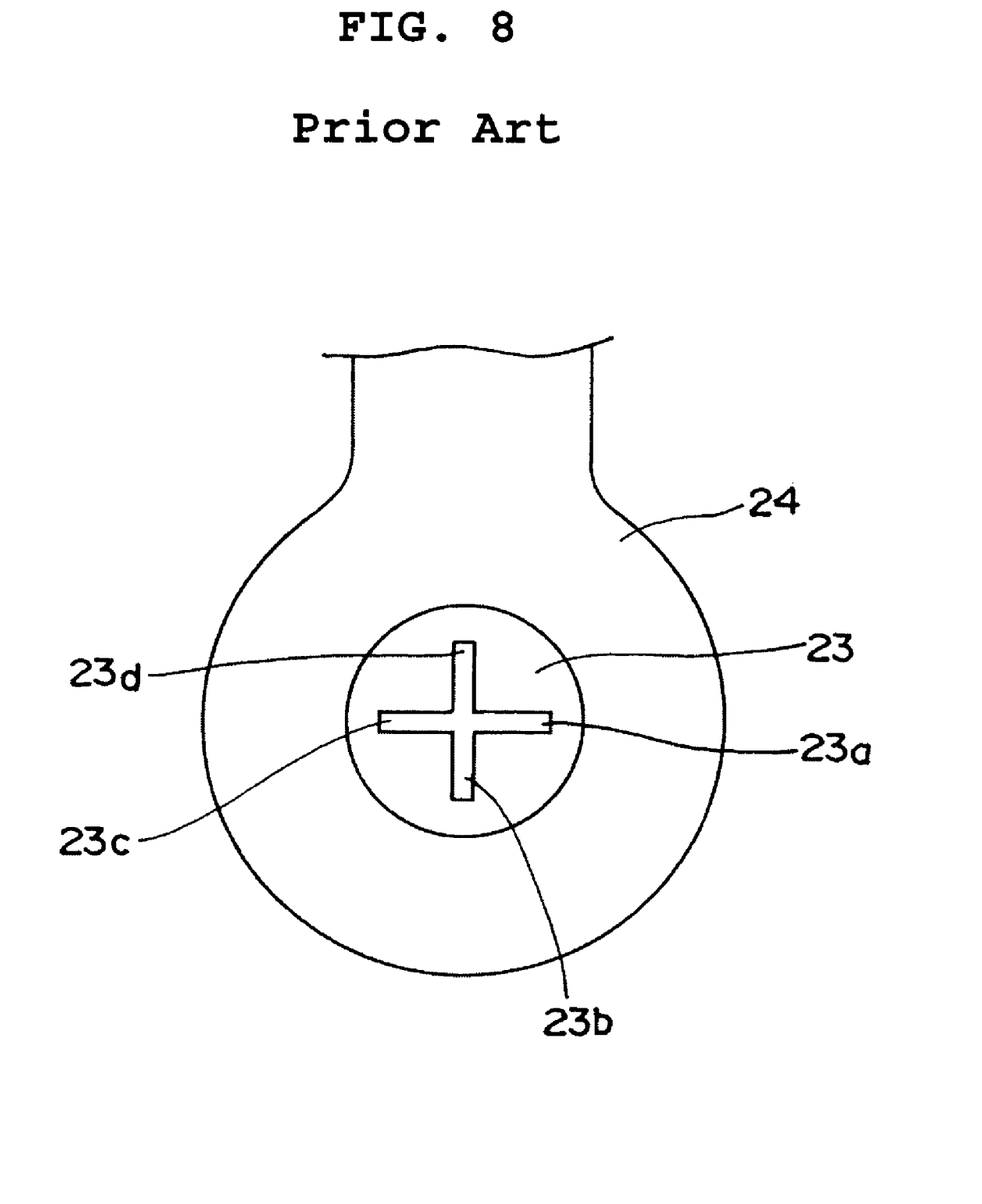
FIG. 8 is a plan view showing a resistor layer of the conventional pressure sensor.

Generally, a pressure sensor 20 is provided with a first substrate 22 having formed thereon a pair of electrode layers 21A and 21B which are spaced apart and face each other, and a second substrate 24 having formed thereon a resistor layer 23 which comes into contact with the pair of electrode layers 21A and 21B to short-circuit the pair of electrode layers 21A and 21B as shown in FIGS. 6 to 8.

The pressure sensor 20 is arranged so that an area of contact between the resistor layer 23 and the pair of electrode layers 21 may proportionally increase with increasing load P applied to at least one of the first and second substrates 22 and 24. Further, the resistor layer 23 of the pressure sensor 20 usually has a circular shape and is formed by applying a conductive resin paste to a surface of the second substrate and drying the paste.

Furthermore, as for the pressure sensor 20 as disclosed in Japanese Patent Application Publication No. 2001-332406 (patent document 1), it is proposed that a plurality of slits 23a-23d are formed in the resistor layer 23 to extend outwardly from the central area in order to improve the detection accuracy of load to better than conventional one. Since the slits 23a-23d are formed in this way, a percentage of paste shrinkage generated at the time of drying and hardening the conductive resin paste becomes smaller. As a result, it is possible to reduce an amount of deformation of the second substrate 24. Therefore, distances between the resistor layer 23 and the pair of electrode layers 21A and 21B can be substantially constant, and the area of contact between the resistor layer 23 and the pair of electrode layers 21A and 21B can be proportionally increased with increasing load. As a result, it is possible to improve the detection accuracy of the load to better than the conventional one.

Incidentally, the conventional pressure sensor is such that the first substrate and the second substrate are deformed by the load applied to the sensor to increase the area of contact between the resistor layer and the electrode layers.

Therefore, in the case where relatively soft substrates are used as the first substrate and the second substrate, sensitivity of the sensor is high since resistance is greatly changed by a small load. However, there is a problem that the whole surfaces of the electrode layer and the resistor layer are brought into contact by a relatively small load, and a range of detection of the loads is narrow.

On the other hand, in the case where relatively hard substrates are used as the first substrate and the second substrate, there is a problem that a small load does not deform the first substrate or the second substrate so that the small load cannot be detected.

In order to solve these problems, the present inventors have diligently studied the pressure sensor whose sensitivity is improved and whose range of detection is broadened by smoothly changing resistance to load in a range of load where the load is relatively small and by increasing a rate of change in resistance to a rate of change in load ($\Delta R/\Delta P$) in a range of load where the load is relatively large.

As a result, we have realized that they relate to flexibility of the resistor layer, unevenness of the resistor layer surface, etc., and made the present invention.

SUMMARY OF THE INVENTION

The present invention aims at providing a pressure sensor and a method of manufacturing the same, which can change the resistance to load smoothly in a relatively small load range and detect the pressure to the extent of relatively large load range.

The pressure sensor in accordance with the present invention made in order to solve the above-mentioned problems is a pressure sensor in which an electrode layer is formed on a surface of a first substrate, a resistor layer is formed, facing the above-mentioned electrode layer, on a second substrate which is opposed to the above-mentioned first substrate through a spacer, as a load applied to at least one of the above-mentioned first substrate and second substrate changes, an area of contact between the resistor layer and the electrode layer changes, the load applied to the above-mentioned substrate is sensed by detecting a resistance change according to the change of the above-mentioned area of contact, an uneven layer is formed of a resin containing non-conductive particles and having insulation properties, on a surface of the above-mentioned second substrate, the resistor layer containing at least carbon powder and having a certain film thickness is formed on a surface of the above-mentioned uneven layer, a sum of the film thickness of the uneven layer between the above-mentioned non-conductive particles and the film thickness of the resistor layer is smaller than a particle diameter of non-conductive particles included in the uneven layer, and at least the resistor layer is formed on the above-mentioned non-conductive particles and between the above-mentioned non-conductive particles.

In addition, by the above-mentioned "the resistor layer having a certain film thickness" we mean one having a film thickness which does not need to be physically constant in thickness at the whole region of the uneven layer surface but may have a substantially constant film thickness. In other words, it may only be in a range which allows certain effects of the present invention as will be described below.

Thus, the above-mentioned resistor layer is formed on the surface of the uneven layer formed of the resin which contains non-conductive particles and has insulation properties. Further, the sum of the thickness of the uneven layer and the thickness of the resistor layer between the above-mentioned non-conductive particles is smaller than the particle diameter of the non-conductive particles included in the uneven layer, and at least the resistor layer is formed on the above-mentioned non-conductive particles and between the above-mentioned non-conductive particles. Therefore, when the substrate is deformed by the load applied to at least one of the above-mentioned first substrate and second substrate, the above-mentioned resistor layer (resistor layer convex portion) on the non-conductive particles comes into contact with the electrode layer portion first.

Then, an increase in load deforms the substrate further, the area of contact between the above-mentioned resistor layer on non-conductive particles and the electrode layer increases gradually, and resistance changes smoothly.

When a larger load is applied and the substrate deforms further, not only the above-mentioned resistor layer (resistor layer projection) on the non-conductive particles but also the resistor layer (resistor layer recessed portion) between the non-conductive particles comes into contact with the electrode layer. As a result, it is possible to change resistance in a high load range and detect a wide range of loads.

It is desirable that the resin film having insulation properties is formed on the above-mentioned non-conductive particles and the resistor layer is further formed on it.

It is also desirable that the above-mentioned uneven layer is formed of a resin containing 1% by weight to 20% by weight of non-conductive particles with a particle diameter of 30 μm to 100 μm and having insulation properties, and a film thickness of the above-mentioned uneven layer is arranged to be 10 μm to 30 μm.

Since undulations of the uneven layer are small when the particle diameter of the above-mentioned non-conductive particles is less than 30 μm, the resistor layer on the non-conductive particles cannot be brought into contact with the electrode layer so that the whole resistor layer comes into contact with the electrode layer, this is not preferred.

On the other hand, when the particle diameter of the above-mentioned non-conductive particles exceeds 100 μm, the non-conductive particles cannot be fixed to the second substrate by the resin having insulation properties, this is not preferred.

Further, when the non-conductive particle content is less than 1% by weight, the uneven layer which provides a property required as the pressure sensor is not formed, this is not preferred. On the other hand, when the non-conductive particle content exceeds 20% by weight, a space (recessed portion in uneven layer) between the non-conductive particles is small, so that resistance cannot be changed with respect to a high load and it is not possible to obtain a wide range of load detection.

The film thickness of the above-mentioned uneven layer depends on the particle diameter of the non-conductive particles to be included. In other words, when using the non-conductive particles with a large particle diameter, the film thickness of the uneven layer is also large.

Further, it is desirable that the above-mentioned non-conductive particles may consist of ceramic particles or synthetic resin particles. In particular, ceramic particles, such as silicon dioxide particles and alumina particles, or synthetic resin particles, such as urethane beads, can be suitably used as the non-conductive particles.

Furthermore, it is desirable that the above-mentioned resistor layer is formed of a resin containing at least 1% by weight to 5% by weight of silicon resin and 1% by weight to 10% by weight of carbon powder and having insulation properties, and the film thickness of the above-mentioned resistor layer is arranged to be 5 μm to 20 μm.

Thus, since the resistor layer contains silicon resin, the resistor layer has flexibility. As a result, when the load is applied, the resistor layer between the non-conductive particles can deform and come into contact with the electrode layer gradually, resistance can be changed with respect to the large load, thus providing the wide range of load detection.

In the case of where the above-mentioned silicon resin content is less than 1% by weight, it is inflexible and unlikely to be deformed, this is not preferred. Further, in the case where it exceeds 5% by weight, it is easily deformed and the wide range of load detection cannot be obtained, this is not preferred.

Further, in the case where the carbon powder content is less than 1% by weight, the resistance is too large, and in the case where it exceeds 10% by weight, the resistance is too small, this is not preferred. The carbon content is set up so that the resistance may be within a range of a few kilohms to tens kilohms.

Furthermore, the film thickness of the above-mentioned resistor layer is set up in terms of the particle diameter of the non-conductive particles and the thickness of the uneven layer.

Still further, as the film thickness of the resistor layer is small, the resistance is large. On the other hand, as the film thickness of the resistor layer is large, the resistance is small. Therefore, by considering the carbon powder content, the film thickness of the above-mentioned resistor layer is set up so that the resistance may be within the range of a few kilohms to tens kilohms.

Yet further, it is desirable that the above-mentioned the second substrate is made of an insulating sheet with a thickness of 25 μm to 250 μm. The insulating sheet with the thickness is preferable in terms of deformation against load.

In addition, the second substrate may only be of an insulating sheet, which is not particularly limited, and it is possible to use materials, such as polyethylene terephthalate, polyethylene naphthalate, polyimide, etc.

Furthermore, it is desirable that the method of manufacturing the above-mentioned pressure sensor includes a step of forming the uneven layer containing non-conductive particles on the surface of the above-mentioned the second substrate and a step of forming the resistor layer on the surface of the above-mentioned uneven layer after forming the above-mentioned uneven layer.

Thus, the uneven layer containing non-conductive particles is formed on the surface of the second substrate and then the resistor layer is formed on the surface of the uneven layer, whereby the resistor layer can be formed on the above-mentioned non-conductive particles.

According to the present invention, it is possible to obtain the pressure sensor which allows the resistance to be changed smoothly in the relatively small load range and can detect the pressure in the relatively large load range. Further, according to the present invention, it is possible to obtain the method of manufacturing the pressure sensor.

DESCRIPTION OF THE PREFERRED EMBODIMENTS

Figure 1:
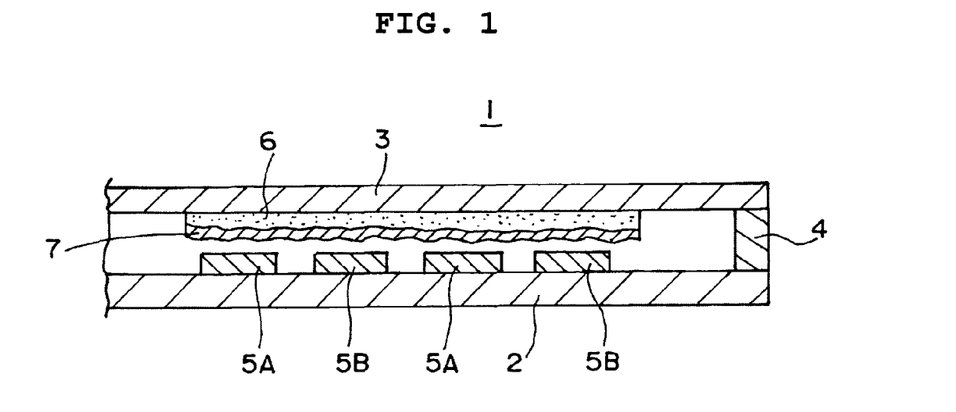
FIG. 1 is a sectional view of a pressure sensor in accordance with a preferred embodiment of the present invention.
Figure 2:
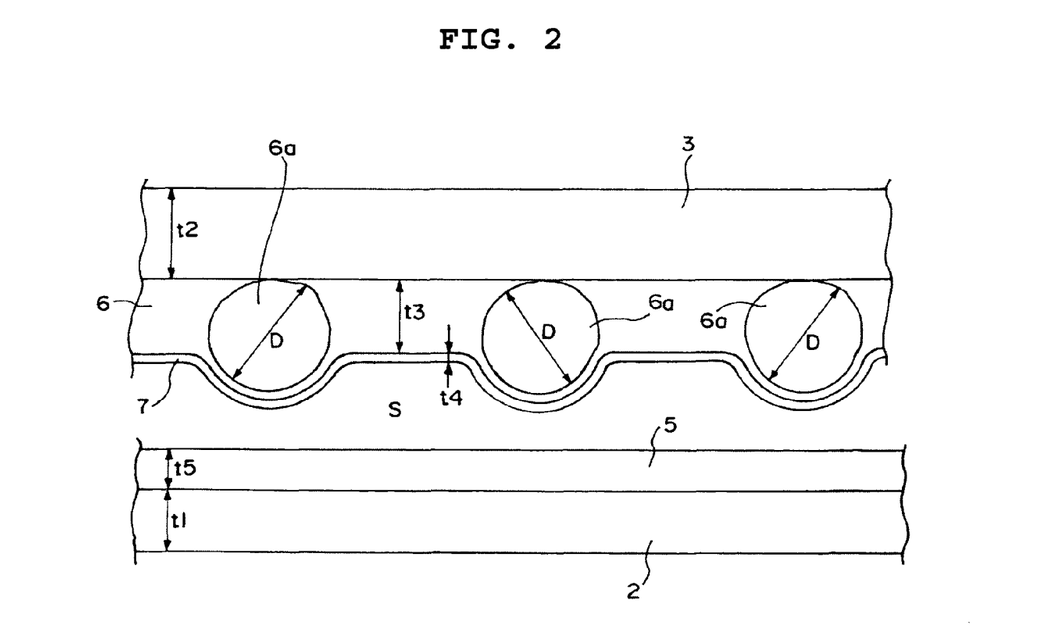
FIG. 2 is a sectional view in which the principal part of the pressure sensor is enlarged.

Next, a preferred embodiment of a pressure sensor in accordance with the present invention will be described with reference to FIGS. 1-4, where FIG. 1 is a sectional view of the pressure sensor in accordance with the preferred embodiment of the present invention, FIG. 2 is a sectional view in which the principal part of the pressure sensor is enlarged, and FIGS.

Figure 3:
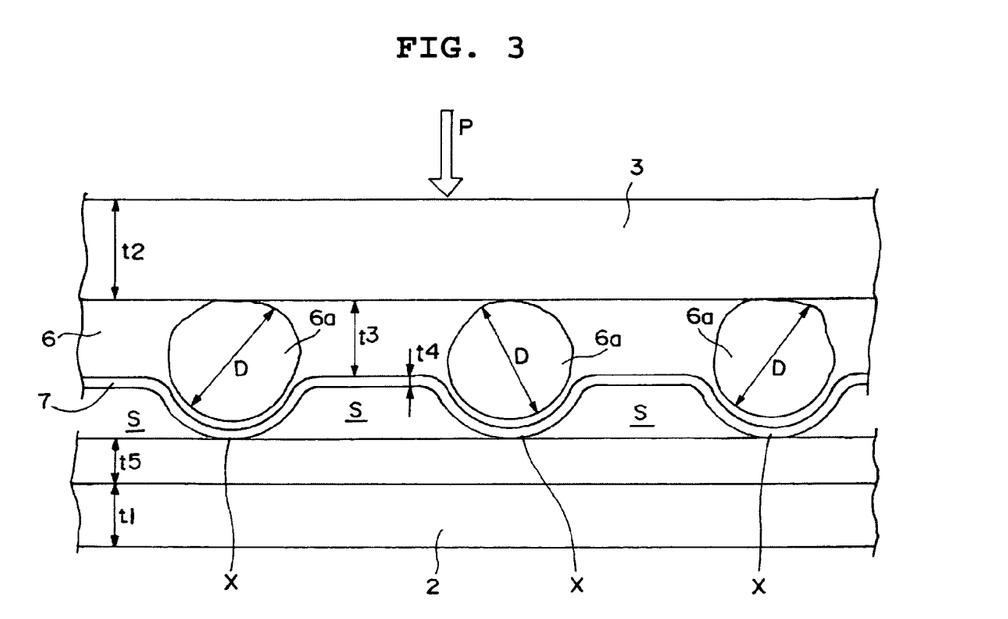
FIG. 3 is a sectional view in which the principal part is enlarged and an operating situation of the pressure sensor is shown.
Figure 4:
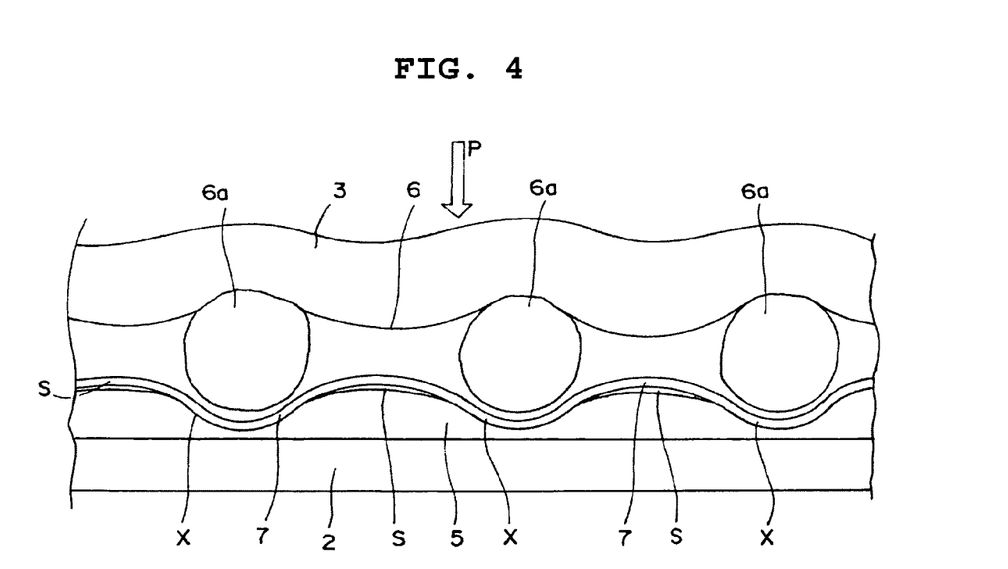
FIG. 4 is a sectional view in which the principal part is enlarged and a situation of the pressure sensor is shown when a load is further applied in the situation as shown in FIG. 3.

3 and 4 are sectional views in which the principal part is enlarged and operation of the pressure sensor is shown when a load is applied.

As shown in FIG. 1, similarly to a conventional pressure sensor, a pressure sensor 1 has a first substrate 2, a second substrate 3, and a spacer 4 joined to circumferential edges of both the substrates so that the first substrate 2 and the second substrate 3 may be spaced apart by a predetermined distance and face each other.

The first substrate 2 may be of any insulating material that can form a pair of electrode layers 5A and 5B (interdigital electrodes). It is possible to use a sheet made of a synthetic resin having insulation properties, such as for example a polyethylene terephthalate resin, a polyethylene naphthalate resin, a polyimide resin, a glass epoxy resin, etc. Further, a thickness of the first substrate 2 is not particularly limited. However, in the case where the first substrate 2 is deformed by a load, it is desirable that a thickness t1 of the first substrate 2 is approximately 25 μm to 250 μm.

Furthermore, the above-mentioned pair of electrode layers 5A and 5B are formed in a similar shape to that of the above-mentioned pair of electrodes 21A and 21B as shown in FIGS. 6-8. The above-mentioned pair of electrode layers 5A and 5B are made of silver or copper. Although a film thickness t5 is not particularly limited, it is preferably 5 μm to 40 μm.

The second substrate 3 is formed of a sheet of a synthetic resin having insulation properties, such as a polyethylene terephthalate resin, a polyethylene naphthalate resin, a polyimide resin, etc. Since this second substrate 3 is arranged to be deformed by the load, a synthetic resin sheet whose thickness t2 is 25 μm to 250 μm is used. In the case where the thickness is less than 25 μm, it is easily deformed by a small load, this is not preferred. Further, if the thickness t2 exceeds 250 μm, it is unlikely to be deformed, this is not preferred.

An uneven layer 6 which contains non-conductive particles 6a in the resin having insulation properties is formed on a surface of the second substrate 3. Here, the description is carried out taking silicon dioxide particles (as non-conductive particles 6a) as an example. In addition, the non-conductive particles are not limited to the above-mentioned silicon dioxide particles, and ceramic particles, such as alumina particles, and synthetic resin particles, such as urethane beads, can be used suitably.

The above-mentioned uneven layer 6 contains 1% by weight to 20% by weight of silicon dioxide 6a having a particle diameter (average particle diameter) D of 30 μm to 100 μm in a resin with insulation properties, such as a polyester-based resin, a polyurethane-based resin, an acrylic resin, an epoxy resin, etc.

Further, a thickness t3 of the uneven layer 6 between the silicon dioxide particles 6a is arranged to be 10 μm to 30 μm. In other words, the thickness t3 of the uneven layer 6 between the silicon dioxide particles 6a is arranged to be smaller than the particle diameter D of silicon dioxide, so that the silicon dioxide particles 6a form the uneven layer 6 (convex portions of the uneven layer 6).

In addition, when the uneven layer 6 containing non-conductive particles is formed, a resin film having the above-mentioned insulation properties may not be formed on the above-mentioned non-conductive particles, but it is preferable that the resin film is formed.

Because, there is a possibility that a projection etc. may exist outside the above-mentioned non-conductive particles and a resistor layer 7 (to be set forth later) which is formed on the upper surface of the resin film (uneven layer 6) may be broken by the above-mentioned projection and the non-conductive particles may be exposed if the resin film is not formed on the above-mentioned non-conductive particles. In other words, there is a possibility that the resistor layer may not be formed on the above-mentioned non-conductive particles.

Further, the resistor layer 7 is formed on the surface of this uneven layer 6. A sum of the thickness t3 of the uneven layer 6 and the thickness t4 of the resistor layer 7 between the above-mentioned silicon dioxide particles 6a is arranged to be smaller than the particle diameter D of silicon dioxide included in the uneven layer 6.

In the case where the sum of the thickness t3 of the above-mentioned uneven layer 6 and the thickness t4 of the resistor layer 7 is equal to or greater than the particle diameter D of the included silicon dioxide, a space portion S (non-contact region) as shown in FIG. 3 is not formed. When the load is applied, the whole resistor layer 7 touches the electrode layer 5, this is not preferred.

In particular, it contains silicon dioxide particles 6a with a particle diameter D of 30 μm to 100 μm, the film thickness t3 of the uneven layer is arranged to be 10 μm to 30 μm, and the film thickness t4 of the resistor layer 7 is arranged to be 5 μm to 20 μm as will be described later. Thus, as shown in FIG. 3, when a load P is applied in an initial state as shown in FIG. 2, the resistor layer 7 at silicon dioxide particles 6a portion comes into contact with the electrode layers 5A and 5B first. In addition, in FIG. 3, X indicates a contact region and S shows the space portion (non-contact region).

At this time, as the resistor layer 7 at the silicon dioxide particles 6a portion (convex portion) comes into contact with the electrode layers 5A and 5B, the area of contact between the resistor layer 7 and the pair of electrode layers 5A and 5B (interdigital electrodes) proportionally increases with increasing load P to be applied. As a result, even a small change in load causes resistance to change greatly.

Further, when the load P equal to or greater than a predetermined intensity is applied, the resistor layer 7 between the silicon dioxide particles 6a gradually comes into contact with the electrode layer 5 as shown in FIG. 4, and the contact region X increases further.

At this time, the resistor layer 7 at the silicon dioxide particles 6a portion has already come into contact with the pair of electrode layers 5A and 5B, so that the change in resistance to the change in load is small. While a rate of change in resistance to a rate of change in load ($\Delta R/\Delta P$) can be further increased by bringing the resistor layer 7 between the silicon dioxide particles 6a into contact with the electrode layer 5 gradually, and it is possible to detect a larger load and obtain a wide range of load detection.

The reason why the particle diameter D of silicon dioxide is arranged to be 30 μm to 100 μm is that in the case where the above-mentioned particle diameter of silicon dioxide is less than 30 μm, the change in unevenness of the uneven layer is small and it is impossible to exclusively bring the resistor layer on the silicon dioxide particles (convex portion of the resistor layer) into contact with the electrode layer in the range where the load is small. On the other hand, another reason is that silicon dioxide particles cannot be fixed to the second substrate 3 by the resin having the insulation properties in the case where the above-mentioned particle diameter of silicon dioxide exceeds 100 μm.

Further, the reason why it contains 1% by weight to 20% by weight of silicon dioxide particles 6a is that a predetermined uneven layer is not formed in the case where the silicon dioxide content is less than 1% by weight. On the other hand, another reason is that in the case where the silicon dioxide content exceeds 20% by weight, the space (recessed portion at uneven layer) between silicon dioxide particles is small and the resistance cannot be gradually changed with respect to the load, and it is not possible to obtain a wide range of load detection.

The above-mentioned resistor layer 7 is formed of a phenol resin containing at least 1% by weight to 5% by weight of silicon resin and 1% by weight to 10% by weight of carbon powder, and the film thickness t4 of the above-mentioned resistor layer is arranged to be 5 μm to 20 μm.

In the case where the above-mentioned silicon resin is less than 1% by weight, it is inflexible and unlikely to be deformed, this is not preferred. Further, in the case where it exceeds 5% by weight, it is very easily deformed and a wide range of load detection cannot be obtained, this is not preferred.

Since the above-mentioned resistor layer 7 contains 1% by weight to 5% by weight of silicon resin, the resistor layer between the silicon dioxide particles is easily deformed when the load is applied. It follows the deformation of the second substrate 3 well, and can be brought into contact with the electrode layer 5 gradually.

Further, in the case where the carbon powder content is less than 1% by weight, the resistance is too large, and in the case where it exceeds 10% by weight, the resistance is too small, this is not preferred. It is desirable that the carbon content is set up so that the resistance may be within a range of a few kilohms to tens kilohms, and generally it contains 1% by weight to 10% by weight of carbon powder.

The film thickness of the above-mentioned resistor layer is set up in terms of the particle diameter of silicon dioxide and the thickness of the uneven layer. Further, as the film thickness of the resistor layer is small, the resistance becomes large. On the other hand, as the film thickness of the resistor layer is large, the resistance becomes small. Therefore, the film thickness of the above-mentioned resistor layer is set up in terms of the carbon powder content so that the resistance may be within a range of a few kilohms to tens kilohms.

The spacer 4 joined to the circumferential edges of both the substrates so that the first substrate 2 and the second substrate 3 may be spaced apart by a predetermined distance and face each other may suitably employ a so-called double-sided adhesive tape.

In addition, as described with reference to the conventional technology, a slit may be formed at the resistor layer so as to raise the accuracy of load detection.

Further, in the case of manufacturing the above-mentioned pressure sensor, the uneven layer containing non-conductive particles is first formed on the surface of the above-mentioned the second substrate. Then, after forming the above-mentioned uneven layer, the resistor layer is formed on the surface of the above-mentioned uneven layer.

Thus, the uneven layer is first formed on the surface of the second substrate, so that the non-conductive particles can be fixed to the surface of the second substrate. Then, after fixing the non-conductive particles to the surface of the second substrate, the resistor layer is formed on the surface of the above-mentioned uneven layer, whereby the resistor layer having a predetermined thickness can be formed also on the above-mentioned non-conductive particles.

In addition, when forming the uneven layer containing the non-conductive particles, it is desirable that the resin film having insulation properties is formed on the above-mentioned non-conductive particles and the resistor layer is further formed on it.

EXAMPLES

Example 1

Using a 125 μm glass epoxy resin for a first substrate, a pair of electrodes (interdigital electrodes) made of copper were formed on a surface of the first substrate by etching. A thickness of the electrodes was set to 38 μm. Using a polyethylene terephthalate resin sheet with a thickness of 125 μm as a second substrate, an uneven layer 6 containing silicon dioxide particles was formed on a surface of the second substrate. The above-mentioned uneven layer 6 containing a polyester-based resin and 10% by weight of silicon dioxide particles with a particle diameter of 50 μm was formed to have a thickness of 20 μm.

Then, a resistor layer 7 was further formed on a surface of this uneven layer 6. A material of a phenol resin containing 5% by weight of silicon resin and 5% by weight of carbon powder was used for the resistor layer 7. A thickness of the resistor layer 7 was arranged to be 10 μm.

Figure 5:
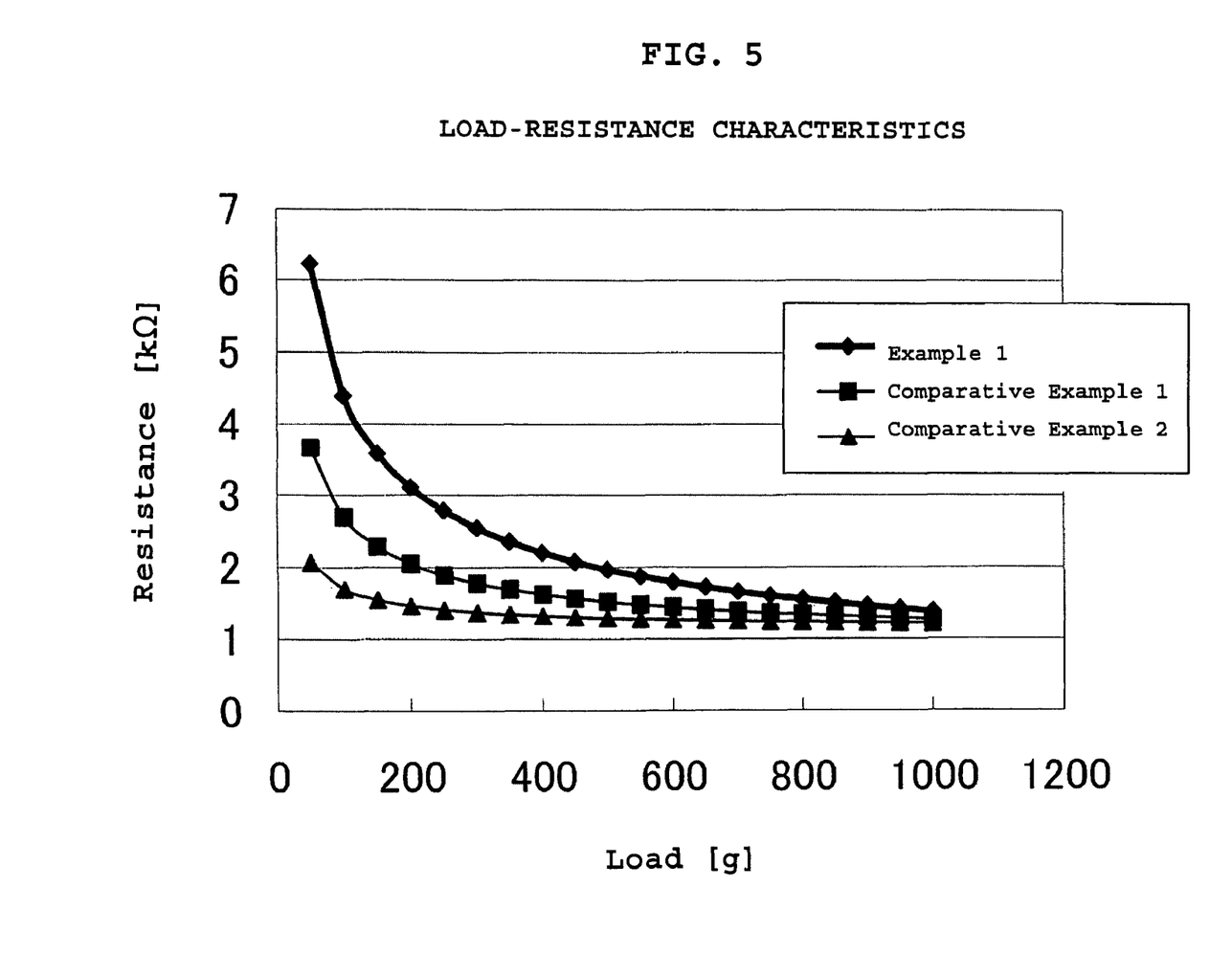
FIG. 5 is a graph showing load-resistance characteristics.

As for the thus formed pressure sensor, change in resistance to change in load was measured. The result is shown in FIG. 5.

Comparative Examples 1 and 2

By varying the particle diameter of silicon dioxide particles, the silicon dioxide content, and the uneven layer film thickness in Example 1 into the respective values in Table 1, pressure sensors (Comparative Examples 1 and 2) were produced, and changes in resistance to load changes were measured. In addition, silicon contents, carbon powder contents, film thicknesses of the resistor layers etc. were the same as those in Example 1. The result is shown in FIG. 5.

TABLE 1

|  | Particle Diameter of Silicon Dioxide (μm) | Silicon Dioxide Content (% by weight) | Film Thickness of Uneven Layer (μm) |
| --- | --- | --- | --- |
| Example 1 | 50 | 10 | 20 |
| Comparative Example 1 | 30 | 10 | 20 |
| Comparative Example 2 | 20 | 10 | 20 |

As can be seen from FIG. 5, in a relatively small load range, the pressure sensor in Example 1 has larger resistance to load compared with Comparative Examples 1 and 2, and the resistance changes smoothly. Further, in a relatively large load range, the pressure sensor of Example 1 the rate of change in resistance to the rate of change in load (ΔR/ΔP) becomes small gradually, however the rate of change in resistance is large compared with Comparative Examples 1 and 2, and it is confirmed that the load detection range can be made wider.

What is claimed is:

1. A pressure sensor in which an electrode layer is formed on a surface of a first substrate; a resistor layer is formed, facing said electrode layer, on a second substrate which is opposed to said first substrate through a spacer; as a load applied to at least one of said first substrate and second substrate changes, an area of contact between the resistor layer and the electrode layer changes; and the load applied to said substrate is sensed by detecting a resistance change according to the change of said area of contact, characterized in that an uneven layer is formed of a resin containing non-conductive particles and having insulation properties, on a surface of said second substrate; and the resistor layer containing at least carbon powder and having a certain film thickness is formed on a surface of said uneven layer, wherein a sum of a film thickness of the uneven layer between said non-conductive particles and the film thickness of the resistor layer is smaller than a particle diameter of the non-conductive particles included in the uneven layer, and at least the resistor layer is formed on said non-conductive particles and between said non-conductive particles.

2. The pressure sensor as claimed in claim 1, characterized in that a resin film having insulation properties is formed on said non-conductive particles and the resistor layer is further formed on the resin film.

3. The pressure sensor as claimed in claim 1, characterized in that said uneven layer is formed of a resin containing 1% by weight to 20% by weight of non-conductive particles with a particle diameter of 30 μm to 100 μm and having insulation properties, and a film thickness of said uneven layer is arranged to be 10 μm to 30 μm.

4. The pressure sensor as claimed in claim 1, characterized in that said non-conductive particles consist of ceramic particles or synthetic resin particles.

5. The pressure sensor as claimed in claim 1, characterized in that said resistor layer is formed of a resin containing at least 1% by weight to 5% by weight of silicon resin and 1% by weight to 10% by weight of carbon powder and having insulation properties, and a film thickness of said resistor layer is arranged to be 5 μm to 20 μm.

6. The pressure sensor as claimed in claim 1, characterized in that said second substrate is made of an insulating sheet having a thickness of 25 μm to 250 μm.

7. A method of manufacturing the pressure sensor as claimed in claim 1, comprising the steps of:
   forming the uneven layer containing non-conductive particles on the surface of said second substrate; and
   forming the resistor layer on the surface of said uneven layer after forming said uneven layer.

* * * * *